United States Patent
Zhang et al.

(10) Patent No.: US 12,481,056 B2
(45) Date of Patent: Nov. 25, 2025

(54) RADAR AND METHOD FOR TARGET DETECTION USING RADAR

(71) Applicant: Wuhan University, Wuhan (CN)

(72) Inventors: Tao Zhang, Wuhan (CN); Jingui Zou, Wuhan (CN)

(73) Assignee: WUHAN UNIVERSITY, Wuhan (CN)

(*) Notice: Subject to any disclaimer, the term of this patent is extended or adjusted under 35 U.S.C. 154(b) by 361 days.

(21) Appl. No.: 18/140,655

(22) Filed: Apr. 28, 2023

(65) Prior Publication Data

US 2023/0350055 A1    Nov. 2, 2023

(30) Foreign Application Priority Data

Apr. 28, 2022 (CN) .......................... 202210469097.5

(51) Int. Cl.
    *G01S 13/90*    (2006.01)
    *G01S 7/298*    (2006.01)
    *G01S 13/02*    (2006.01)

(52) U.S. Cl.
    CPC ............. *G01S 13/90* (2013.01); *G01S 7/298* (2013.01); *G01S 13/9004* (2019.05); *G01S 13/9023* (2013.01); *G01S 2013/0245* (2013.01)

(58) Field of Classification Search
    CPC .................... G01S 7/298; G01S 2013/0245
    See application file for complete search history.

(56) References Cited

U.S. PATENT DOCUMENTS 4,706,088 A * 11/1987 Weindling .............. G01S 13/90
                                                    342/25 A
6,549,159 B1 * 4/2003 Wolframm .......... G01S 13/9082
                                                    342/158

OTHER PUBLICATIONS

Berland, F., Fromenteze, T., Decroze, C., Kpre, E., Boudesocque, D., Pateloup, V., Bin, P., Aupetit-Berthelemot, C. (Jul. 15, 2021). Cylindrical MIMO-SAR imaging and associated 3-D Fourier processing. Antennas and Propagation, vol. 3, pp. 196-205 (Year: 2021).*

Yang, K., Liao, G., Wang, W., Xu, Q., Li, D. (Apr. 2013). 3-D imaging method for ROSAR. IET International Radar Conference 2013. https://doi.org/10.1049/cp.2013.0138 (Year: 2013).*

* cited by examiner

*Primary Examiner* — Vladimir Magloire
*Assistant Examiner* — Anna K. Gosling
(74) *Attorney, Agent, or Firm* — JCIP GLOBAL INC.

(57) ABSTRACT

A radar includes antennas, a receiving system, a transmitting system, and a short orbit. The short orbit is provided with a receiving system capable of reciprocating motion thereon; or, the short orbit is provided with a transmitting system capable of reciprocating motion thereon; or, the short orbit is provided with both a receiving system and a transmitting system capable of reciprocating motion thereon.

5 Claims, 1 Drawing Sheet

RADAR AND METHOD FOR TARGET DETECTION USING RADAR

CROSS-REFERENCE TO RELAYED APPLICATIONS

Pursuant to 35 U.S.C. § 119 and the Paris Convention Treaty, this application claims foreign priority to Chinese Patent Application No. 202210469097.5 filed Apr. 28, 2022, the contents of which, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to the field of remote sensing information and, in particular, to a radar and a method for target detection using the radar.

Radar interferometry is an important precision measurement means. A microwave radar has the advantages of good penetration, long distance and high accuracy, and is widely used in disaster prevention and mitigation and the deformation monitoring of a structure. Since a single fixed real aperture radar does not have azimuthal resolution, a synthetic aperture radar is often used in practice to achieve the azimuthal resolution and thus obtain the position of a target. The synthetic aperture radar has a larger amount of data than the single fixed real aperture radar and is more complex to process. Currently, synthetic aperture modes are generally an orbital mode, a rotary mode, and a MIMO mode. The most classic mode is the orbital mode, which is extremely mature, stable in operation and highly accurate. However, because the length of an orbit is directly related to the azimuthal resolution, in order to achieve a certain azimuthal resolution, the length of the orbit must be long enough. However, for mechanical reasons, the running speed of the radar along the orbit is limited, so the longer the orbit is, the longer it takes to scan once, which means a longer scanning cycle and decreasing monitoring frequency. Therefore, an instantaneous displacement cannot be captured, resulting in a decreased monitoring effect for targets such as bridges and buildings. A long orbit features large volume and weight. The same problem is also found for rotating synthetic aperture radar. The MIMO mode of the radar can achieve a higher monitoring frequency. However, antenna spacing and antenna size are a pair of contradictions. The antenna size directly affects antenna gains, which in turn affects the observation distance, while the antenna spacing affects imaging quality. In addition to this, the imaging algorithm of the currently commonly used synthetic aperture radar is less efficient and is not conducive to real-time observation.

SUMMARY

The above technical problems of the disclosure are solved mainly by the following technical solutions:
A radar comprising antennas, a receiving system, and a transmitting system, is characterized in that it also comprises a short orbit;
the short orbit is provided with a receiving system capable of reciprocating motion thereon;
or, the short orbit is provided with a transmitting system capable of reciprocating motion thereon;
or, the short orbit is provided with both a receiving system and a transmitting system capable of reciprocating motion thereon.

For the radar described above, the short orbit is provided with a receiving system capable of reciprocating motion thereon, and the length of the short orbit is greater than or equal to the spacing of the antennas.

For the radar described above, the short orbit is provided with a transmitting system capable of reciprocating motion thereon, and the length of the short orbit is greater than or equal to the spacing of the antennas.

For the radar described above, the short orbit is provided with both a receiving system and a transmitting system capable of reciprocating motion thereon, and the length of the short orbit is greater than or equal to half of the spacing of the antennas.

A method for target detection using the radar comprises:
performing data acquisition to obtain the raw radar echo data arranged in order of the acquisition space;
performing focused imaging of the phased array antenna of raw radar echo data, i.e. performing Fourier transform of the raw radar echo data to obtain the radar echo data comprising data arrays converted to the frequency domain;
performing a delay correction of the data array with the set antenna phase delay parameters to obtain the corrected radar echo data;
performing a spatial domain Fourier transform of the corrected data to obtain the transformed radar echo data; and
determining the actual angle of the azimuth direction represented by the transformed radar echo data to obtain the image.

For the target detection method, during data acquisition, the moving interval of the orbit is defined as the antenna spacing a, and the number of moving steps as k. To ensure data quality, the moving interval of the orbit d should be much smaller than the wavelength $\lambda$, so d is set to be less than $\lambda/10$.

After the initiation of data collection, the radar scans once to collect data each time when the orbit drives the transmitting antenna to move for d from the starting point, till the orbit reaches the end point, when the orbit has moved a distance of a. The collected data is stored as:

Start position $0*d$: $A_{1,1}, A_{2,1}, A_{3,1} \ldots A_{n,1}$,

Orbit position $1*d$: $A_{1,2}, A_{2,2}, A_{3,2} \ldots A_{n,2}$,

Orbit position $2*d$: $A_{1,3}, A_{2,3}, A_{3,3} \ldots A_{n,3}$,

...

End position $(k-1)*d = a$: $A_{1,k}, A_{2,k}, A_{3,k} \ldots A_{n,k}$

Where, each unit A is an array whose length is related to the scanning time; if the scanning time is t and the sampling rate is sp, the array length is the product of t and sp. Each row is a radar scan when the orbit stays at a position, and each column corresponds to a receiving antenna; n is the number of receiving antennas, and k is the number of steps moved, that is, arrays of k rows and n columns are obtained, with the length of each array being t*sp.

The elements of A in this array matrix are taken out one by one from top to bottom, and then from left to right, starting from the top left corner, and the raw data is reorganized and expanded into one dimension:

$$A_{1,1}, A_{1,2}, A_{1,3}, \ldots A_{1,k},$$

$$A_{2,1}, A_{2,2}, A_{2,3}, \ldots A_{2,k},$$

$$\ldots$$

$$A_{n,1}, A_{n,2}, A_{n,3}, \ldots A_{n,k}$$

Thus, n*k raw radar echo data arranged in order of acquisition space is obtained, with the length of each echo data being t*sp. Each A is actually an array with a length of t*sp, so:

$$A=B(1,2,3,4,5 \ldots t{*}sp)$$

$$A=B(1,2,3,4,5 \ldots t{*}sp)$$

Thus, if each A element is expanded to B, the above one-dimensional array is actually array B with a length of n*k in the first dimension and t*sp in the second dimension:

$$B_{1,1}, B_{1,2}, B_{1,3}, B_{1,4}, \ldots B_{1,t{*}sp},$$

$$B_{2,1}, B_{2,2}, B_{2,3}, B_{2,4}, \ldots B_{2,t{*}sp},$$

$$B_{3,1}, B_{3,2}, B_{3,3}, B_{3,4}, \ldots B_{3,t{*}sp},$$

$$\ldots$$

$$B_{n{*}k,1}, B_{n{*}k,2}, B_{n{*}k,3}, B_{n{*}k,4}, \ldots B_{n{*}k,t{*}sp}$$

This data is equivalent to that obtained with a single receiving antenna orbit radar with an orbit length of a*n, and the observation period is reduced to 1/n of that of a conventional orbit radar.

For the above method for target detection, the specific method for focused imaging of the phased array antenna on the raw observation data is to First, perform Fourier transform of each row of the data array B in order to convert each row from the time domain to the frequency domain of the raw information:

$$F=fft(B)$$

Obtain a new data array:

$$F_{1,1}, F_{1,2}, F_{1,3}, F_{1,4}, \ldots F_{1,t{*}sp},$$

$$F_{2,1}, F_{2,2}, F_{2,3}, F_{2,4}, \ldots F_{2,t{*}sp},$$

$$F_{3,1}, F_{3,2}, F_{3,3}, F_{3,4}, \ldots F_{3,t{*}sp},$$

$$\ldots$$

$$F_{n{*}k,1}, F_{n{*}k,2}, F_{n{*}k,3}, F_{n{*}k,4}, \ldots F_{n{*}k,t{*}sp}$$

The different elements in each row of the F array represent the corresponding FFT bin whose module indicates the target reflection intensity within that distance and whose phase angle represents the distance phase of the target.

For the above method for target detection, the specific method for making a delay correction of F array with the stored antenna phase delay parameters is as follows:

F array has n*k rows, where the data of rows 1 to k is obtained from antenna 1, and the data of rows k+1 to 2*k is obtained from antenna 2, and so on; accordingly, the data of rows (n−1)*k to n*k is obtained from antenna n.

The correction method is to divide the data of each row by the correction value of the corresponding antenna in the correction parameter array C, i.e., F data of rows (n−1)*k to n*k divided by the $n^{th}$ element of the C array (division of complex numbers is geometrically equivalent to the correction of the phase angle). For example, each element of F data of rows 1 to k is divided by the first element of the correction parameter array C.

Accordingly, the corrected data FC is obtained:

$$FC_{1,1}, FC_{1,2}, FC_{1,3}, FC_{1,4}, \ldots FC_{1,t{*}sp},$$

$$FC_{2,1}, FC_{2,2}, FC_{2,3}, FC_{2,4}, \ldots FC_{2,t{*}sp},$$

$$FC_{3,1}, FC_{3,2}, FC_{3,3}, FC_{3,4}, \ldots FC_{3,t{*}sp},$$

$$\ldots$$

$$FC_{n{*}k,1}, FC_{n{*}k,2}, FC_{n{*}k,3}, FC_{n{*}k,4}, \ldots FC_{n{*}k,t{*}sp}$$

In the above method for target detection, for the data of each row, there is a distance of d between the antennas; therefore, there is a slight difference in the distance phase of the same target. This slight difference is related to the distance D and azimuth angle α of the targets. the distance D of targets is much bigger than d; the same target is usually at the same position of each row of data, namely, the same FFT bin; therefore, the phase difference between the data sampled from two adjacent rows is d*sin α/λ.

Therefore, the spatial domain Fourier transform of the array FC is performed column by column in the column direction, i.e., Fourier transform for ($FC_{1,1}$, $FC_{2,1}$, $FC_{3,1}$, ... $FC_{n{*}k,1}$), ($FC_{1,2}$, $FC_{2,2}$, $FC_{3,2}$, ... $FC_{n{*}k,2}$) ... to ($FC_{1,t{*}sp}$, $FC_{2,t{*}sp}$, $FC_{3,t{*}sp}$, ... $FC_{n{*}k,t{*}sp}$); then FCF data array can be obtained when rotated back to the original direction:

$$FCF_{1,1}, FCF_{1,2}, FCF_{1,3}, FCF_{1,4}, \ldots FCF_{1,t{*}sp},$$

$$FCF_{2,1}, FCF_{2,2}, FCF_{2,3}, FCF_{2,4}, \ldots FCF_{2,t{*}sp},$$

$$FCF_{3,1}, FCF_{3,2}, FCF_{3,3}, FCF_{3,4}, \ldots FCF_{3,t{*}sp},$$

$$\ldots$$

$$FCF_{n{*}k,1}, FCF_{n{*}k,2}, FCF_{n{*}k,3}, FCF_{n{*}k,4}, \ldots FC_{n{*}k,t{*}sp}$$

This operation makes the row where the azimuthal direction of the target is located the peak of the FFT result. Therefore, the FCF array horizontally represents the target signal in the direction of the distance (namely, the distance information) and longitudinally represents the information in the azimuth direction of the target signal (namely, the angle or azimuth information).

In the above method for target detection, the specific method for obtaining the image by determining the actual angle in the azimuth direction represented by FCF array longitudinally is as follows:

An array ANG with a size of n*k is created, with the content of:

arcsin(x*λ/(2*d)), where x decreases in steps from 1 to −1 with a step length of 2/(n*k).

The ANG array is a series of angles that correspond to the elements of each column of data of FCF array. the focused imaging can be obtained simply by taking the array ANG as the Y axis scale (ranging from −90° to 90°) and the distance as the X axis scale (ranging from 0 to the maximum distance of the radar) to make the FCF data array value a graph.

Since the value domain of the sin function is located at [−1,1], the ANG array may have outliers at the start and end of the data array as long as d<λ/2; the outliers and the corresponding rows in the FCF data array at the corresponding position should be deleted.

In that case, the image is in a polar coordinate mode. the horizontal coordinate of this array corresponds to the distance, the amplitude of each element represents the reflection intensity of the target, the phase angle represents the distance phase of the target, and the value of the ANG array element corresponding to the row number represents the azimuth angle α of the target; therefore, the following method can be adopted to convert the data results to Cartesian coordinates:

$$X = D * \cos \alpha$$

$$Y = -D * \sin \alpha$$

Thus, the disclosure has the following advantages: 1. In the disclosure, the advantages of a mechanical type synthetic aperture radar and an array type synthetic aperture radar (MIMO, SIMO, MISO) are combined. Compared with the mechanical type synthetic aperture radar in the prior art, the disclosure features faster scanning, shorter orbit, lower mechanical complexity, and less power consumption. Compared with the array type synthetic aperture radar, the disclosure features improved detection distance and imaging resolution. 2. The disclosure significantly improves the imaging speed of the synthetic aperture radar, lowering the resource requirements of the imaging algorithm. Traditional modes for imaging such as Omega-K or Back Project take up large resources and are inefficient, while the disclosure uses the fast searching method of antenna analog array angles for imaging, which greatly accelerates imaging, saves memory resources and facilitates real-time monitoring.

Figure 1:
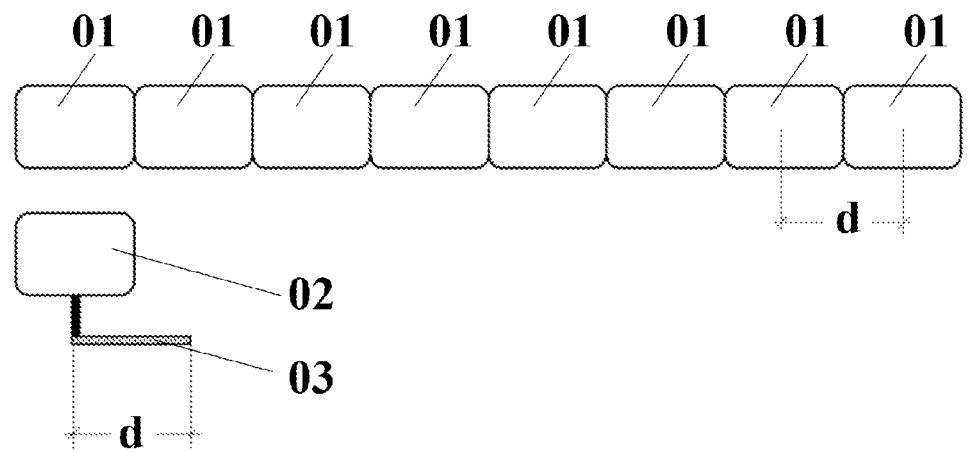
FIG. 1 is a schematic diagram of the disclosure, and an example of a transmitting antenna mounted on a slide rail.
Figure 2:
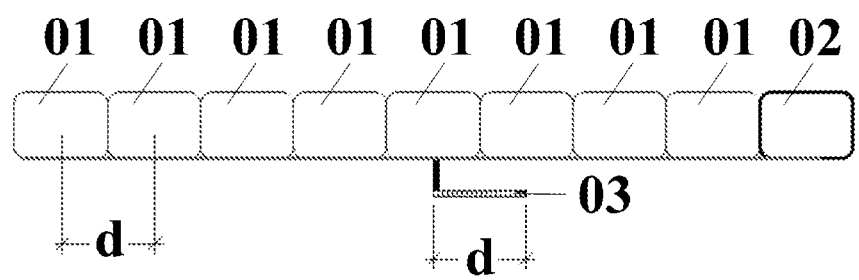
FIG. 2 is an example of both transmitting and receiving antennas mounted on a slide rail.
Figure 3:
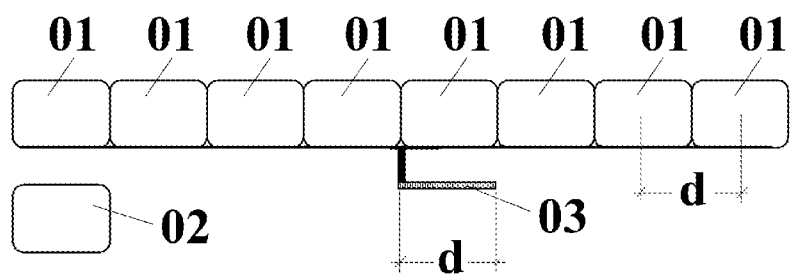
FIG. 3 is an example of a receiving antenna mounted on a slide rail.

In the drawings, the following reference numbers are used: 01. Receiving antenna array; 02. Transmitting antenna; 03. Spacing d between orbit antennas

DETAILED DESCRIPTION

The following is a further specific description of the technical solution of the disclosure through the examples, and in combination with the attached figures.

Example

I. Structure of the Disclosure.

The disclosure comprises antennas, a receiving system, a transmitting system, and a short orbit. The short orbit is provided with a receiving system, or a transmitting system, or both a receiving system and a transmitting system capable of reciprocating motion thereon. In the disclosure, the characteristics of MIMO and the advantages of the orbital synthetic aperture radar are combined. A mode of single-transmitting multiple-receiving or multiple-transmitting multiple-receiving is adopted in the receiving and transmitting systems of the antenna. The size of the antenna is reasonably designed to ensure a gain. The antenna spacing becomes large as the size of the antenna is large. As mentioned above, the short orbit has a length slightly longer than the antenna spacing. Both the receiving and transmitting parts of antennas are placed on this short orbit to move, or only the transmitting antenna is placed on the short orbit to move, with the receiving antenna fixed, or only the receiving antenna is placed on the short orbit to move, with the transmitting antenna fixed. Regardless of any of the three methods, the moving range of the orbit only needs to cover the spacing of two antennas to fill the antenna gap. Then, the collected data is reorganized into a sequential scanning sequence, thus forming rich data for imaging. This not only ensures the imaging quality and an observation distance, but also increases an observation speed. The receiving system and the transmitting system is subject to a MIMO multi-antenna transceiver system or a SIMO multi-receiving single-transmitting form, a MISO multi-transmitting single-receiving form or other forms.

It Structure Design Principle of the Disclosure.

The central wavelength of the radar is assumed to be λ, which is usually several millimeters to several centimeters. The sampling frequency is p, which is usually a few tens of Hz. The antenna width is a, which is generally several centimeters to a dozen centimeters. Typically, a high gain antenna is used to ensure a measurement distance. The aperture of a high gain antenna is large and usually larger than one wavelength, i.e., a>λ. If a conventional orbit radar is used, it is assumed that the length of the orbit is l, generally ranging between 1 and 3 meters, and that the running speed of the orbit is v, generally several centimeters per second. Then, the observation period is $t_{rail}=1/v$, namely, a one-way time that the orbit runs, generally in a few tens of seconds, and the observation distance is v/p, about several millimeters. And if a single-row MIMO is only used, n antennas are configured and closely arranged. So, the antenna spacing is equal to a. n is usually 4, 8, 16 and other values. The value of the n must be close to 1/a, in order to obtain the orbit radar effect of the length of l. Then, the antenna spacing is greater than one wavelength. Although the observation period is equal to 1/p and shortened to within 1 second, the collected data is too sparse in space and unfavorable for imaging.

In the disclosure, a MIMO multi-antenna transceiver system is used and then is placed on an orbit whose travel is a. In case of the same movement and sampling rate as the orbital radar described above, the observation period is: a/v. Since a is close to 1/n, the observation period t is close to $t_{rail}/n$. Therefore, the disclosure can effectively improve the observation efficiency. The observation spacing of the radar of the disclosure is the same as that of the conventional orbital radar, so the imaging effect and the observation distance can be guaranteed as well.

Since there are components such as a cable and a low-noise amplifier between the receiving circuit of the radar and the antenna, the phase delay of each receiving antenna is different. The phase delay needs to be measured and corrected before the use to reduce impact on imaging. A general measurement correction method is that in a microwave darkroom, a vector network analyzer is used or the radar is directly used to align an antenna array with the corner reflector that is located in the vertical bisector of the receiving antenna array. The distance Dcr of the corner reflector from the antenna array should be greater than:

$(L*L/4 - \lambda*2)/(2*\lambda)$ (L, length of the antenna array, and λ, wavelength), to avoid phase blurring.

A phase delay measurement record for each antenna is stored as a complex number on a unit circle in a correcting constant array C for backup. The length of C is n and n is the number of the antennas.

If a conventional orbital radar is used, an orbital travel (or an orbital travel interval) l=1 m. The orbital speed v=0.05 m/sec. The data is collected 20 times per second. The antenna width is 0.0625 m. Then, the observation period is 20 seconds, and the observation spacing is 0.0025 m. And if the MIMO radar technology in the prior art is used, the antenna width is also 0.0625 m. if the length of 1 m of an orbit is obtained, 16 receiving antennas are needed, with the antenna spacing of 0.0625 m. If the observation frequency is 20 Hz, the observation period is shortened to 0.05 seconds. However, currently, most of the monitoring radars feature a C-wave band or above, the wavelength of the radar is generally less than 0.06 m. Therefore, the antenna spacing of 0.0625 m is too sparse and almost difficult to image. If a L-wave band is used, the antenna gain of 0.0625 m width is too small. The effective distance is too short, and it is also difficult to image. If the method of the disclosure is used, the antenna width is 0.0625 m, and a mode of 1 transmitting and 16 receiving is adopted. The receiving antenna array is fixed, and the transmitting antenna moves with the orbit. The orbit travel is only 0.0625 m. Assuming that the running speed v of the orbit is also 0.05 m per second, the observation period needs only 1.25 seconds. If the data is collected 20 times per second, the observation spacing is also 0.0025 m. This is equivalent to forming a MIMO array of 16*0.0625/0.0025=16*25=400 antennas, but it is much simpler than the MIMO array of 400 antennas. Only 17 antennas need to be used. The same imaging quality and observation distance as the traditional orbital radar can be achieved. Further, a much higher observation speed than the traditional orbital radar is provided. In addition, the orbit length is shortened. The load of orbit is greatly reduced. The size, weight and power consumption are consequently reduced. The advantages of the traditional orbital radar and traditional MIMO radar are combined.

Traditional modes for imaging such as Omega-K or Back Project take up large resources and are inefficient, while the disclosure uses the fast searching method of antenna analog array angles for imaging, which greatly accelerates imaging, saves memory resources and facilitates real-time monitoring.

III. Principle of Target Detection Using the Disclosure.

Step A: Collecting data according to the following method:

The moving interval of the orbit is the antenna spacing a, and the number of the moving steps is k. To ensure the data quality, it is necessary to make the orbit moving interval d much smaller than the wavelength $\lambda$. Generally, d can be set less than $\lambda/10$.

After the initiation of data collection, the radar scans once to collect data each time when the orbit drives the transmitting antenna to move for d from the starting point, till the orbit reaches the end point, when the orbit has moved a distance of a. The collected data is stored as:

Start position $0*d$: $A_{1,1}, A_{2,1}, A_{3,1} \ldots A_{n,1}$,

Orbit position $1*d$: $A_{1,2}, A_{2,2}, A_{3,2} \ldots A_{n,2}$,

Orbit position $2*d$: $A_{1,3}, A_{2,3}, A_{3,3} \ldots A_{n,3}$,

...

End position $(k-1)*d = a$: $A_{1,k}, A_{2,k}, A_{3,k} \ldots A_{n,k}$

Where, each unit A is an array whose length is related to the scanning time; if the scanning time is t and the sampling rate is sp, the array length is the product of t and sp. Each row is a radar scan when the orbit stays at a position, and each column corresponds to a receiving antenna; n is the number of receiving antennas, and k is the number of steps moved, that is, arrays of k rows and n columns are obtained, with the length of each array being t*sp.

The elements of A in this array matrix are taken out one by one from top to bottom, and then from left to right, starting from the top left corner, and the raw data are reorganized and expanded into one dimension:

$A_{1,1}, A_{1,2}, A_{1,3}, \ldots A_{1,k}$, $A_{2,1}, A_{2,2}, A_{2,3}, \ldots A_{2,k}$,

...

$A_{n,1}, A_{n,2}, A_{n,3}, \ldots A_{n,k}$

Thus, n*k raw radar echo data arranged in order of acquisition space is obtained, with the length of each echo data being t*sp. Each A is actually an array with a length of t*sp, so:

$A=B(1,2,3,4,5 \ldots t*sp)$

Thus, if each A element is expanded to B, the above one-dimensional array is actually array B with a length of n*k in the first dimension and t*sp in the second dimension:

$B_{1,1}, B_{1,2}, B_{1,3}, B_{1,4}, \ldots B_{1,t*sp}$, $B_{2,1}, B_{2,2}, B_{2,3}, B_{2,4}, \ldots B_{2,t*sp}$, $B_{3,1}, B_{3,2}, B_{3,3}, B_{3,4}, \ldots B_{3,t*sp}$,

...

$B_{n*k,1}, B_{n*k,2}, B_{n*k,3}, B_{n*k,4}, \ldots B_{n*k,t*sp}$

This data is equivalent to that obtained with a single receiving antenna orbit radar with an orbit length of a*n, and the observation period is reduced to 1/n of that of a conventional orbit radar because of the adoption of this method.

Step B: Performing focused imaging of the phased array antenna of raw observation data:

First, perform Fourier transform of each row of the data array B in order to convert each row from the time domain to the frequency domain of the raw information:

$F=fft(B)$

Obtain a new data array:

$F_{1,1}, F_{1,2}, F_{1,3}, F_{1,4}, \ldots F_{1,t*sp}$, $F_{2,1}, F_{2,2}, F_{2,3}, F_{2,4}, \ldots F_{2,t*sp}$, $F_{3,1}, F_{3,2}, F_{3,3}, F_{3,4}, \ldots F_{3,t*sp}$,

...

$F_{n*k,1}, F_{n*k,2}, F_{n*k,3}, F_{n*k,4}, \ldots F_{n*k,t*sp}$

The different elements in each row of the F array represent the corresponding FFT bin whose module indicates the target reflection intensity within that distance and whose phase angle represents the distance phase of the target.

Step C: Making a delay correction of F array with the stored antenna phase delay parameters:

F array has n*k rows, where the data of rows 1 to k is obtained from antenna 1, and the data of rows k+1 to 2*k is obtained from antenna 2, and so on; accordingly, the data of rows (n−1)*k to n*k is obtained from antenna n.

The correction method is to divide the data of each row by the correction value of the corresponding antenna in the correction parameter array C, i.e., F data of rows (n−1)*k to n*k divided by the $n^{th}$ element of the C array (division of complex numbers is geometrically equivalent to the correction of the phase angle). For example, each element of F data of rows 1 to k is divided by the first element of the correction parameter array C.

Accordingly, the corrected data FC is obtained:

$$FC_{1,1}, FC_{1,2}, FC_{1,3}, FC_{1,4}, \ldots FC_{1,t*sp},$$

$$FC_{2,1}, FC_{2,2}, FC_{2,3}, FC_{2,4}, \ldots FC_{2,t*sp},$$

$$FC_{3,1}, FC_{3,2}, FC_{3,3}, FC_{3,4}, \ldots FC_{3,t*sp},$$

$$\ldots$$

$$FC_{n*k,1}, FC_{n*k,2}, FC_{n*k,3}, FC_{n*k,4}, \ldots FC_{n*k,t*sp}$$

Step D: For the data of each row, there is a distance of d between the antennas; therefore, there is a slight difference in the distance phase of the same target. This slight difference is related to the distance D and azimuth angle α of the targets. The distance D of targets is much bigger than d; the same target is usually at the same position of each row of data, namely, the same FFT bin; therefore, the phase difference between the data sampled from two adjacent rows is $d*\sin \alpha/\lambda$.

Therefore, the spatial domain Fourier transform of the array FC is performed column by column in the column direction, i.e., Fourier transform for ($FC_{1,1}$, $FC_{2,1}$, $FC_{3,1}$, ... $FC_{n*k,1}$), ($FC_{1,2}$, $FC_{2,2}$, $FC_{3,2}$, ... $FC_{n*k,2}$) ... to ($FC_{1,t*sp}$, $FC_{2,t*sp}$, $FC_{3,t*sp}$, ... $FC_{n*k,t*sp}$); then FCF data array can be obtained when rotated back to the original direction:

$$FCF_{1,1}, FCF_{1,2}, FCF_{1,3}, FCF_{1,4}, \ldots FCF_{1,t*sp},$$

$$FCF_{2,1}, FCF_{2,2}, FCF_{2,3}, FCF_{2,4}, \ldots FCF_{2,t*sp},$$

$$FCF_{3,1}, FCF_{3,2}, FCF_{3,3}, FCF_{3,4}, \ldots FCF_{3,t*sp},$$

$$\ldots$$

$$FCF_{n*k,1}, FCF_{n*k,2}, FCF_{n*k,3}, FCF_{n*k,4}, \ldots FC_{n*k,t*sp}$$

This operation makes the row where the azimuthal direction of the target is located the peak of the FFT result. Therefore, the FCF array horizontally represents the target signal in the direction of the distance (namely, the distance information) and longitudinally represents the information in the azimuth direction of the target signal (namely, the angle or azimuth information).

Step E: Obtaining the image by determining the actual angle in the azimuth direction represented by FCF array longitudinally An array ANG with a size of n*k is created, with the content of:

$\arcsin(x*\lambda/(2*d))$, where x decreases in steps from 1 to −1 with a step length of 2/(n*k).

Thus it can be seen that the ANG array is a series of angles that correspond to the elements of each column of data of FCF array; the focused imaging can be obtained simply by taking the array ANG as the Y axis scale (ranging from −90° to 90°) and the distance as the X axis scale (ranging from 0 to the maximum distance of the radar) to make the FCF data array value a graph.

Since the value domain of the sin function is located at [−1,1], the ANG array may have outliers at the start and end of the data array as long as d<λ/2; the outliers and the corresponding rows in the FCF data array at the corresponding position should be deleted.

In that case, the image is in a polar coordinate mode. the horizontal coordinate of this array corresponds to the distance, the amplitude of each element represents the reflection intensity of the target, the phase angle represents the distance phase of the target, and the value of the ANG array element corresponding to the row number represents the azimuth angle α of the target; therefore, the following method can be adopted to convert the data results to Cartesian coordinates:

$$X = D * \cos \alpha$$

$$Y = -D * \sin \alpha$$

Throughout the focused imaging, the most resource-intensive is a Fourier transform. The fast Fourier transform is very mature, which is much simpler and more effective than other algorithms (other focusing algorithms require interpolation and other processing in addition to the Fourier transform, which is more resource-intensive). It is easy to achieve GPU acceleration and multi-threaded operations. Actual tests show that in this method, it only takes about one percent of the time that it takes for the Back Project algorithm and the memory consumption is only about one tenth of that of the Back Project algorithm, under the same CPU and memory resources.

IV. Specific Case Application of the Structure Design Principle Set Out in Part II.

Taking a C-wave band radar (assuming a center frequency of 5450 MHz) as an example, the wavelength is 0.055 cm. A design sampling interval distance is 0.0125 m. The moving speed of the orbit is 0.05 m per second. The sampling rate of the radar is 1000000 times per second. The scanning time is 0.001 second. The data of each scanning is 1000, and an action distance is 500 m. For the mode used, receiving antennas form an array, while only one transmitting antenna is used and moves along a short orbit.

1. Design and Manufacture of Antennas and Antenna Arrays.

First, a single receiving antenna is designed. The common horn antenna is adopted to obtain a horn antenna with a gain of about 15 dBi, with the antenna width of 0.125 m taken as a constraint. Eight receiving antennas are adopted in the design, achieving a 1.0 m long receiving antenna array and 0.125 m antenna spacing.

2. Calibration of the Antenna Array.

In the microwave darkroom, the eight receiving antennas of the antenna array are connected to eight receiving channels of the radar. At a certain distance Dcr from the antenna (when the corner reflector is located on the vertical bisector of the antenna array, the formula $Dcr > (L*L/4 - \lambda*2)/(2*\lambda)$ can be used to determine the minimum Dcr. L is the length of the antenna array, and λ is the wavelength), the corner reflector is placed. Dcr is greater than 2.25 m. The radar is turned on. Signals are transmitted. The phase value of the corner reflector received by each receiving antenna is recorded as a C array for backup. Due to the large span of the receiving antenna array, high frequency, there is a connector, a RF switch and other devices on a link in addition to a cable. Loss can often reach 3 dB. In order to compensate for the loss, the size of the transmitting antenna can be appropriately larger, to get greater gain. In this example, the transmitting antenna is designed as a 0.18 m wide horn antenna. The gain is about 18 dBi. The loss of the receiving channel is just compensated.

3. Design and Manufacture of the Antenna Assembly.

In this example, a mode in which the receiving antenna is stationary and the transmitting antenna moves along the orbit is used. A moving platform (the orbit) of the transmitting antenna uses a stepper motor to drive a screw shaft. The stepper motor and transmitting and receiving parts of the radar are controlled by a main controller synchronously. The radar transmits and receives data once per step further. With the orbital travel of greater than 0.125 m, both sides need to leave a safe distance, so it is ok for the total travel to be 0.2 m. The transmitting antenna is fixed to a slider of the orbit, so that it can move along the orbit.

The antenna direction of the receiving antenna array is the same as that of the transmitting antenna. A certain distance between the receiving antenna array and the transmitting antenna is provided to ensure the isolation of transmission and reception. The specific spacing is related to a lobe shape of the antenna direction figure. The receiving and transmitting antennas should not fall into a relatively strong side lobe.

V. Specific Case Application of the Target Detection Principle Set Out in Part III.

1. Collecting Data for Pre-Processing.

The orbit movement is controlled. The radar is controlled to transmit signals when the orbit is located at i*0.0125 m (i=0, 1, 2, 3, 4 . . . 9) and to receive data through the eight antennas in the eight channels.

$$\text{Start position } 0^*0.0125 \text{ m: } A_{1,1}, A_{2,1}, A_{3,1} \ldots A_{8,1},$$

$$\text{Orbit position } 1^*0.0125 \text{ m: } A_{1,2}, A_{2,2}, A_{3,2} \ldots A_{8,2},$$

$$\text{Orbit position } 2^*0.0125 \text{ m: } A_{1,3}, A_{2,3}, A_{3,3} \ldots A_{8,3},$$

$$\ldots$$

$$\text{End position } 9^*0.0125 \text{ m: } A_{1,10}, A_{2,10}, A_{3,10} \ldots A_{8,10}$$

The above data is reorganized in order from top to bottom and left to right and stretched into a one-dimensional array A:

$$A_{1,1}, A_{1,2}, A_{1,3}, \ldots A_{1,10},$$
$$A_{2,1}, A_{2,2}, \ldots A_{2,10},$$
$$A_{3,1}, A_{3,2}, \ldots A_{3,10},$$
$$\ldots$$
$$A_{8,1}, A_{8,2}, \ldots A_{8,10}$$

There are 80 rows in total.

Each unit A is an array of the length of 1000. Array A is expanded into array B:

$$B_{1,1}, B_{1,2}, B_{1,3}, B_{1,4}, \ldots B_{1,1000},$$
$$B_{2,1}, B_{2,2}, B_{2,3}, B_{2,4}, \ldots B_{2,1000},$$
$$B_{3,1}, B_{3,2}, B_{3,3}, B_{3,4}, \ldots B_{3,1000},$$
$$\ldots$$
$$B_{80,1}, B_{80,2}, B_{80,3}, B_{80,4}, \ldots B_{80,1000}$$

Array B is made with the fast Fourier transform F=fft(B) row by row.

A new array F is obtained:

$$F_{1,1}, F_{1,2}, F_{1,3}, F_{1,4}, \ldots F_{1,1000},$$
$$F_{2,1}, F_{2,2}, F_{2,3}, F_{2,4}, \ldots F_{2,1000},$$
$$F_{3,1}, F_{3,2}, F_{3,3}, F_{3,4}, \ldots F_{3,1000},$$
$$\ldots$$
$$F_{80,1}, F_{80,2}, F_{80,3}, F_{80,4}, \ldots F_{80,1000}$$

Data of each row is divided by the correction value of the corresponding antenna in the correction parameter array C, i.e., F data of rows (n−1)*k to n*k divided by the $n^{th}$ element of the C array (division of complex numbers is geometrically equivalent to the correction of the phase angle). For example, each element of F data of rows 1 to k is divided by the first element of the correction parameter array C.

Accordingly, the corrected data FC is obtained:

$$FC_{1,1}, FC_{1,2}, FC_{1,3}, FC_{1,4}, \ldots FC_{1,1000},$$
$$FC_{2,1}, FC_{2,2}, FC_{2,3}, FC_{2,4}, \ldots FC_{2,1000},$$
$$FC_{3,1}, FC_{3,2}, FC_{3,3}, FC_{3,4}, \ldots FC_{3,1000},$$
$$\ldots$$
$$FC_{80,1}, FC_{80,2}, FC_{80,3}, FC_{80,4}, \ldots FC_{80,1000}$$

2. Focused Imaging.

First, Fourier transform of the array FC is performed column by column in the column direction, i.e., Fourier transform for $$(FC_{1,1}, FC_{2,1}, FC_{3,1}, \ldots FC_{80,1}),$$
$$(FC_{1,2}, FC_{2,2}, FC_{3,2}, \ldots FC_{80,2}) \ldots$$
$$\text{to}$$
$$(FC_{1,1000}, FC_{2,1000}, FC_{3,1000}, \ldots FC_{80,1000})$$

Then FCF data array can be obtained when rotated back to the original direction:

$$FCF_{1,1}, FCF_{1,2}, FCF_{1,3}, FCF_{1,4}, \ldots FCF_{1,1000},$$
$$FCF_{2,1}, FCF_{2,2}, FCF_{2,3}, FCF_{2,4}, \ldots FCF_{2,1000},$$
$$FCF_{3,1}, FCF_{3,2}, FCF_{3,3}, FCF_{3,4}, \ldots FCF_{3,1000},$$
$$\ldots$$
$$FCF_{80,1}, FCF_{80,2}, FCF_{80,3}, FCF_{80,4}, \ldots FCF_{80,1000}$$

This operation makes the row where the azimuthal direction of the target is located the peak of the FFT result. Therefore, the FCF array horizontally represents the target signal in the direction of the distance (distance information) and longitudinally represents the information in the azimuth direction of the target signal (azimuth information).

An array ANG is created, with the element of:

arcsin(x*0.055/(2*0.0125)), where x decreases in steps from 1 to −1, with a step length of 2/80, namely, 0.025.

The size of the ANG array is 80 elements, which correspond to the column elements of the FCF array.

Since the value domain of the sin function is limited to [−1,1], the elements of the ANG array are valid only when x falls between 0.025/0.055 and −0.025/0.055, and the ANG array actually achieved is:

ANG=[n/a, n/a, . . . 1.3453, 1.1655, 1.04175 . . . −1.04175, −1.1655, −1.3453 . . . n/a, n/a]

22 elements in the front and 22 elements in the back are invalid.

According to the validity of the elements of the ANG array, lines 1 to 22 and lines 59 to 80 of the FCF array are deleted, leaving only lines 23 to 58. Only elements 23 to 58 of the ANG array are also retained.

Then, the FCF array comprises 36 rows and 1000 columns, with each row corresponding to one element of the ANG array and the corresponding value in the ANG array being the azimuth angle of the point; each column corresponds to a distance of 0 to 500 meters in steps of 0.5 meter, i.e., a complex number image in a polar coordinate mode.

the horizontal coordinate of this array corresponds to the distance, the amplitude of each element represents the reflection intensity of the target, the phase angle represents the distance phase of the target, and the row number represents the azimuth angle $\alpha$ of the target; therefore, the following method can be adopted to convert the data results to Cartesian coordinates:

$X = D * \cos \alpha$ $Y = -D * \sin \alpha$

In this example, before the disclosure is used, the time for one scanning is 1/0.05=20 seconds, while after the disclosure is used, the time for one scanning is only 0.125/0.05=2.5 seconds. The speed is increased to 8 times of that before, while the length of the orbit is only 1/8 of that before. The overall volume and weight of the radar is greatly reduced. The reliability is increased, and maintenance costs are significantly reduced.

This example is intended to illustrate an implementation method only, and the parameters are not carefully optimized.

It will be obvious to those skilled in the art that changes and modifications may be made, and therefore, the aim in the appended claims is to cover all such changes and modifications.

What is claimed is:

1. A method for target detection, comprising:
   performing data acquisition using a radar device to obtain raw radar echo data arranged in order of an acquisition space;
   wherein during data acquisition, a moving interval of an orbit is defined as an antenna spacing,
   wherein the moving interval of the orbit is set to be less than $\lambda/10$, wherein a wavelength is denoted as 2;
   wherein performing data acquisition comprises driving a transmitting antenna by the orbit to move for the moving interval of the orbit from a starting point until the orbit reaches an end point, when the orbit has moved a distance; and
   performing focused imaging of a phased array antenna of raw radar echo data, wherein the step of performing the focused imaging comprises:
   performing a Fourier transform of the raw radar echo data to obtain transformed data comprising one or more data arrays converted to a frequency domain;
   performing a delay correction of the one or more data arrays with a set antenna phase delay parameters to obtain corrected radar echo data;
   performing a spatial domain Fourier transform of the corrected radar echo data to obtain second transformed radar echo data; and
   determining an actual angle of an azimuth direction represented by the second transformed radar echo data to obtain an image;
   after performing data acquisition to collect data, collected radar echo data is stored as:

start position $0^* d$: $A_{1,1}, A_{2,1}, A_{3,1} \ldots A_{n,1}$, orbit position $1^* d$: $A_{1,2}, A_{2,2}, A_{3,2} \ldots A_{n,2}$, orbit position $2^* d$: $A_{1,3}, A_{2,3}, A_{3,3} \ldots A_{n,3}$,

...

...

end position $(k-1)^* d = a$: $A_{1,k}, A_{2,k}, A_{3,k} \ldots A_{n,k}$;

wherein each unit A is an array, the moving interval of the orbit is denoted as d, the antenna spacing is denoted as a, the number of moved steps of the orbit is denoted as k, a number of receiving antennas is denoted as n, the distance the orbit has moved is the antenna spacing;
   wherein a length of the array A is determined by a scanning time t and a sampling rate sp, such that the length of the array A is the product of t and sp;
   wherein elements of the array A are taken out one by one from top to bottom, and then from left to right, starting from the top left corner, $A_{1,1}$, and the raw radar echo data is reorganized and expanded into one dimension:

$A_{1,1}, A_{1,2}, A_{1,3}, \ldots A_{1,k}$, $A_{2,1}, A_{2,2}, A_{2,3}, \ldots A_{2,k}$,

...

$A_{n,1}, A_{n,2}, A_{n,3} \ldots A_{n,k}$ obtaining n*k raw radar echo data arranged in order of the acquisition space with the length of each of the raw radar echo data being t*sp, wherein each element of the array A is a one-dimensional array with a length of t*sp, so:

$A=B(1,2,3,4,5 \ldots t^*sp)$;

wherein in response to each of elements of the array A is expanded to a data array B, the one-dimensional array is the data array B with a length of n*k in the first dimension and t*sp in the second dimension:

$$B_{1,1}, B_{1,2}, B_{1,3}, B_{1,4}, \ldots B_{1,t^*sp},$$

$$B_{2,1}, B_{2,2}, B_{2,3}, B_{2,4}, \ldots B_{2,t^*sp},$$

$$B_{3,1}, B_{3,2}, B_{3,3}, B_{3,4}, \ldots B_{3,t^*sp},$$

$$\ldots$$

$$B_{n^*k,1}, B_{n^*k,2}, B_{n^*k,3}, B_{n^*k,4}, \ldots B_{n^*k,t^*sp}$$

wherein this data is equivalent to that obtained with a single receiving antenna orbit radar with an orbit length of a*n, and an observation period is reduced to 1/n of that of a conventional orbit radar.

2. The method of claim 1, wherein performing the focused imaging of the phased array antenna of the raw radar echo data comprises:
performing the Fourier transform of each row of the data array B to convert the each row of the data array B from a time domain to a frequency domain, thereby generating a data array F:

$$F_{1,1}, F_{1,2}, F_{1,3}, F_{1,4}, \ldots F_{1,t^*sp},$$

$$F_{2,1}, F_{2,2}, F_{2,3}, F_{2,4}, \ldots F_{2,t^*sp},$$

$$F_{3,1}, F_{3,2}, F_{3,3}, F_{3,4}, \ldots F_{3,t^*sp},$$

$$\ldots$$

$$F_{n^*k,1}, F_{n^*k,2}, F_{n^*k,3}, F_{n^*k,4}, \ldots F_{n^*k,t^*sp}$$

wherein different elements in each row of the data array F represent a corresponding FFT bin, a module of the corresponding FFT bin indicates a target reflection intensity within the distance a, and a phase angle of the corresponding FFT bin represents a distance phase of a target.

3. The method of claim 2,
wherein the data array F has n*k rows, where rows 1 to k of the data array F are obtained from antenna 1, and rows k+1 to 2*k of the data array F are obtained from antenna 2, and so on; accordingly, rows (n−1) *k to n*k of the data array F are obtained from antenna n;
wherein performing the delay correction of the one or more data arrays with the set antenna phase delay parameters to obtain the corrected radar echo data comprises:
dividing each row of the data array F by a correction value of a corresponding antenna in a correction parameter array C, wherein the rows (n−1) *k to n*k of the data array F is divided by the $n^{th}$ element of the correction parameter array C, and each element of the rows 1 to k of the data array F is divided by a first element of the correction parameter array C; and obtaining a corrected data array FC as the following:

$$FC_{1,1}, FC_{1,2}, FC_{1,3}, FC_{1,4}, \ldots FC_{1,t^*sp},$$

$$FC_{2,1}, FC_{2,2}, FC_{2,3}, FC_{2,4}, \ldots FC_{2,t^*sp},$$

$$FC_{3,1}, FC_{3,2}, FC_{3,3}, FC_{3,4}, \ldots FC_{3,t^*sp},$$

$$\ldots$$

$$FC_{n^*k,1}, FC_{n^*k,2}, FC_{n^*k,3}, FC_{n^*k,4}, \ldots FC_{n^*k,t^*sp}$$

4. The method of claim 3, wherein performing the spatial domain Fourier transform of the corrected radar echo data to obtain second transformed radar echo data comprises:
performing the spatial domain Fourier transform of the corrected data array FC to obtain a data array FCF when rotated back to an original direction:

$$FCF_{1,1}, FCF_{1,2}, FCF_{1,3}, FCF_{1,4}, \ldots FCF_{1,t^*sp},$$

$$FCF_{2,1}, FCF_{2,2}, FCF_{2,3}, FCF_{2,4}, \ldots FCF_{2,t^*sp},$$

$$FCF_{3,1}, FCF_{3,2}, FCF_{3,3}, FCF_{3,4}, \ldots FCF_{3,t^*sp},$$

$$\ldots$$

$$FCF_{n^*k,1}, FCF_{n^*k,2}, FCF_{n^*k,3}, FCF_{n^*k,4}, \ldots FC_{n^*k,t^*sp}$$

wherein the data array FCF horizontally represents a target signal in a direction of the distance a, namely, distance information, and longitudinally represents information in the azimuth direction of the target signal.

5. The method of claim 4, wherein obtaining the image by determining the actual angle of the azimuth direction represented by the data array FCF comprises:
generating an array ANG with a size of n*k, wherein each element corresponds to an angle value calculated by:

$$\arcsin\left(x * \frac{\lambda}{2d}\right),$$

where x decreases in steps from 1 to −1 with a step length of 2/(n*k);
wherein the array ANG is a series of angles that correspond to the elements of each column of the data array FCF; the focused imaging can be obtained by taking the array ANG as a Y axis scale (ranging from −90° to 90° and the distance as an X axis scale (ranging from 0 to the maximum distance of the radar) to make the values data array FCF as a graph;
wherein since a value domain of a sin function is located at [−1, 1], the array ANG will have outliers at start and end of the array ANG as long as d</2; the outliers and corresponding rows in the data array FCF at corresponding position should be deleted; and
converting the image from a polar coordinate mode to Cartesian coordinates is done using X=D*cos α and Y=−D* sin α, wherein D is the distance of the target and α is the azimuth angle from the array ANG.

* * * * *